United States Patent Office 2,758,038
Patented Aug. 7, 1956

2,758,038

PROCESS OF MAKING ARTIFICIALLY COLORED MINERAL GRANULES

Alfred Paul Lentz, Los Angeles, Samuel T. Rudish, Bell Gardens, and Andrew Szabo, Los Angeles, Calif., assignors to The Patent and Licensing Corporation, New York, N. Y., a corporation of Massachusetts No Drawing. Application October 28, 1953,
Serial No. 388,916

3 Claims. (Cl. 117—100)

This invention relates to color coatings, more particularly color coatings for artificially coloring mineral granules of the type commonly used for surfacing asphalt coated roofing and for like purposes.

It has long been the practice in the roofing and other industries to utilize mineral granules which are given a desired color by applying a film of color coating to the surface of the base granule.

For the most part, the base granules usually employed consist of naturally occurring mineral material, crushed and graded to suitable size. Among such mineral material have been crushed slate, trap rock, so-called greystone, quartz, and the like.

In each instance, the aim has been to affix to the surface of the granule a pigment of desired color or shade by means of a suitable affixing agent or agents, accompanied by treatment appropriate thereto.

In some instances the pigment is incorporated in a fused or ceramic glaze coating applied to the granules by heat treatment, at temperatures of the order of 850 to 1800° F. It is known, for example, to apply the coloring to the granules by utilizing soluble alkali metal silicates, such as sodium silicate, for affixing the pigment and other constituents of the color coating to the surface of the granules, and for that purpose to subject the coated granules to heat treatment at temperautres of the order of 850 to 1500° F., in order to insolubilize the soluble silicate and fuse the color coating on the surface of the granules.

In other instances, the pigment or other coloring material has been applied to the granules by means of a soluble alkali metal silicate insolubilized by heat treatment at considerably lower temperatures than those mentioned in the preceding paragraph, viz., temperatures of the order of approximately 400 to say 700° F. In this type of procedure for artificially coloring mineral granules, especially for use as as a weathering surface on asphalt roofing or the like, insolubilization of the soluble silicate has generally entailed also the use of reactants to provide on the granules a film capable of withstanding the effects of the weather and exhibiting resistance to "blooming" and other objectionable effects.

Sodium silicate conventionally employed as the bonding or affixing agent in the production of color coated mineral granules is a hydrated form of sodium silicate. A number of such soluble silicates have long been available for this purpose. The most commonly used varieties are those in which the ratio of silica to soda is between approximately 2.8 and 3.7 $SiO_2$ to one $Na_2O$.

As is well known, the soluble silicates differ somewhat in their respective properties. The Philadelphia Quartz Company, a well-known manufacturer of soluble silicates, makes available for industrial use a relatively large variety of soluble silicates, each identified by a particular brand letter, depending primarily upon its relative content of $Na_2O$ and $SiO_2$ and upon its water content. The variety known as "N" brand sodium silicate has a specific gravity of approximately 1.4 and contains approximately 62 percent of water, the balance being made up of approximately 9 percent of $Na_2O$ and 29 percent of $SiO_2$.

The hydrated, water-soluble sodium silicates above-referred to, usually contain from 3 to 7 molecules of combined $H_2O$, the "N" brand silicate most usually employed being the pentahydrate form.

The water content of these soluble silicates is of the order of 55 to 70 percent. When used in the production of artificially colored granules, the wet film of the soluble silicate, pigment and other necessary or desired ingredients applied to the granules must be subjected to heat treatment in order to eliminate the moisture content therefrom and to insolubilize and fix the color film in bonded relationship with the surface of the granule.

It has been observed, in producing this type of artificially colored granule, that the drying or firing of the coloring composition on the granules results frequently in a film marked by multitudinous pin holes and blisters and having an uneven thickness. We have found that these defects in the color film are to a great extent responsible for the tendency on the part of the color coating to be stained by the asphalt in which the granules are partially embedded in making asphalt roofing or the like, and is responsible also, to a considerable extent, for the frequent inadequacy of adhesion of the color film to the granule base. Likewise, and notwithstanding that the base granules themselves would normally exhibit good adhesion to the layer of asphalt in which they are embedded, the pin holes or blisters occurring in the color films applied to the granules by the process above-mentioned cause a decrease of adhesion of the colored granules to the asphalt layer.

The principal object of the invention is to provide color coated granules and a process for producing the same, utilizing water-soluble silicates as the bonding or affixing medium for adhering the color coatings to the granules, but in which, as distinguished from prior known practices, the color coating on the granules will be in the form of a continuous film, free of pin holes and blisters, and possessing substantially uniform film thickness.

We have found that granules coated in accordance with the invention exhibit markedly superior adhesion between the color film and the surface of the granules, excellent affinity for adhesion to asphalt, as well as excellent resistance to staining of the color film on the exposed areas of the granules by asphalt in which the granules may be partially embedded. Constituents of certain asphalts that are frequently used in the manufacture of asphalt roofing frequently cause highly objectionable staining of color films on the exposed areas of granules partially embedded in the asphalt. Granules artificially colored in accordance with our invention exhibit marked resistance to staining of the color film by such asphalts.

Another object of the invention is to provide color coated mineral granules characterized by the superior qualities above set forth, yet which may be produced without material alteration of the conventional manipulative steps employed in the color coating of mineral granules by processes of the type wherein a water-soluble sodium silicate is employed to bond the pigment and other ingredients of the color coating to the surface of the granules.

Speaking broadly, the objects of the invention may be achieved by utilizing as the fixing or bonding component of the color coating, one of the conventional varieties of a hydrated, water-soluble, alkali metal silicate, together with a relatively large proportion of powdered, anhydrous alkali metal silicate, preferably, powdered anhydrous sodium silicate.

For best results, the anhydrous silicate is in the form of a powder of a fineness such as to have 95% passing a 100 mesh screen and none retained on an 80 mesh screen.

In general, the amount of powdered anhydrous silicate that may be employed for this purpose may vary from 15 to 50 percent, based on the dry weight of the hydrated water-soluble silicate.

The anhydrous alkali metal silicate, more particularly anhydrous, sodium silicate employed in the practice of the invention, may be made by the fusion of sand and sodium carbonate or sodium sulphate in a furnace, the melt being retained in the furnace for some time prior to its discharge therefrom in order properly to refine the same and produce a homogenous product free from carbonates or residual sand grains. Anhydrous sodium silicate usually obtained in this manner is in the form of a viscous melt, and after being cooled in the furnace may be discharged therefrom into water so as to be quickly cooled thereby into a highly fractured glassy condition sometimes referred to as a frit or cullet, or may be discharged into molds for relatively slow cooling therein into a glass or crystalline structure or the melt may be chilled between rolls to provide a glass in flake form.

Another form of anhydrous alkali metal silicate that may be employed in the practice of the invention is one made by fusing sodium metasilicate pentahydrate.

The anhydrous silicate employed is accordance herewith is one exhibiting a water-solubility rate such that usually considerably less than 20 percent of its weight will dissolve in water within 15 minutes at normal temperatures when crushed and screened to pass a 10 mesh screen and be retained on a 14 mesh screen. This relatively low water solubility of the anhydrous silicate compares with a water solubility rate of not less than 75 percent in the same period of time, characteristic of the sodium silicate pentahydrate granulated to the same mesh size.

The anhydrous alkali metal silicate employed in accordance with the invention is likewise distinguishable by its low rate of water solubility from anhydrous alkali metal silicates having rates of water solubility approximately equal to those of the hydrated alkali metal silicates. They are, furthermore, substantially insoluble in aqueous solutions of the hydrated forms of alkali metal silicate.

The anhydrous sodium silicate employed in accordance herewith is practically insoluble in water, except by autoclaving under pressure for a considerable period of time. Having substantially no water absorbent properties, they do not materially affect the viscosity of color coating compositions containing water-soluble hydrated alkali metal silicate. The amount of water added to the coating composition does not materially affect the anhydrous silicate, and the viscosity of the coating composition is not measurably affected by the addition thereto of the powdered, anhydrous sodium silicate.

Under the heat treatment by which hydrated silicate-containing color coating compositions applied to mineral granules are ordinarily dried and fired, namely, at temperatures even as high as 1000° F., the hydrated alkali-metal silicate component of the coating still contains approximately 15 to 20 percent of water of hydration, whereas the anhydrous silicate component of our composition is initially completely anhydrous.

While we do not wish to be restricted to any particular theory of the reactions involved, we believe that when the granules are color-coated with a composition containing pigment, hydrated, water-soluble sodium silicate and a substantial proportion of anhydrous sodium silicate, and then fired at temperatures of the order of 400° F. or above, the anhydrous sodium silicate serves to seed the hydrated silicate as it undergoes dehydration, thereby forming crystalline structures approaching those of anhydrous sodium silicate. We believe, further, that the initially added anhydrous sodium silicate under these conditions of operation itself forms an impervious, insoluble glass-like surface, somewhat plasticized by the partially dehydrated sodium silicate formed during the operation from the water-soluble, hydrated sodium silicate. Whether or not the foregoing postulations fully explain the effects obtained, the fact remains that color coating films formed on granules, produced as herein set forth, have good adhesion to the surface of the granules themselves, and also to asphalt layers in which they may be partially embedded, so as not to become abraded away or otherwise detached therefrom, as is often the case in the storage, handling and use of asphalt roofing or the like. They possess a glass-like or glazed character (bearing considerable likeness in this respect to granules which would normally require much higher firing temperatures) and very low water solubility, as well as no tendency to act by capillary action or otherwise so as to become stained or discolored by asphalt coatings in which they may be partially embedded.

One form of anhydrous silicate that may be employed in the practice of the invention is a product sold by the Philadelphia Quartz Company, under the designation known as "Calquartz 325," or SS Silicate. This material is employed in the form of a powder reduced to a size such as to have 95% passing a 100 mesh screen and none retained on an 80 mesh screen.

In one specific embodiment of the invention, a color coating composition applied to one ton of mineral granules was composed of the following ingredients, in the amounts indicated:

| | Lb. |
|---|---|
| Titanium oxide | 7.5 |
| Lithopone | 45.0 |
| Black slate dust | 18.0 |
| Hydrated alkali metal silicate ("N" brand sodium silicate) | 70.0 |
| Anhydrous sodium silicate ("Calquartz 325") | 8.0 |

In accordance with conventional practice, the granules themselves were of a size such as to pass an 8 mesh screen and be retained on a 35 mesh screen. The coating composition was applied to the granules by flowing the same while being tumbled in a suitable mixing device such as a paddle mixer. After being subjected to sufficient mixing to insure substantially complete coverage of the granules by the coating composition, the coated granules were subjected to drying and firing in a conventional rotary kiln wherein they were fired for approximately 15 minutes at an emergent granule temperature of approximately 600° F. The granules were discharged from the kiln and cooled. If desired, the thus coated granules may be oiled in accordance with conventional or known practice.

Since the "N" brand sodium silicate is composed of approximately 38 percent solids and 62 percent water, it will be seen that in the above formula the anhydrous silicate was employed in a ratio of approximately 31 percent, by weight of the solids content of the water-soluble, hydrated silicate. It will be understood, however, that this ratio may be varied considerably in the practice of the invention, depending primarily upon the particular grade of the soluble silicate employed, the specific nature of the granules, and the attendant operating conditions. In general, however, it may be stated that the amount of anhydrous sodium silicate present in the color coating composition will be from about 15 percent to about 50 percent of the water-soluble hydrated silicate present therein, on the dry weight basis.

In preparing the coating composition hereof for application to mineral granules or the like, more or less conventional procedure may be employed. As illustrative thereof, the dry components may be pre-mixed and then added to the required amount of the soluble sodium silicate in a suitable mixer, where the ingredients are agitated until a homogeneous coating mixture is formed. A batch of the base granules to be coated is charged to a suitable paddle mixer or tumbling device and the required amount of the coloring composition formed as described is added to the granules in the tumbling device. Agitation is continued for a period of several minutes or until the granules are uniformly wetted on their surfaces with the coating composition. The wet, color-coated granules are thereupon charged into a rotary firing kiln at a rate of say 3 to 7 tons per hour and fired therein at the desired temperature. The granules discharged from the kiln are transferred to a cooling kiln and cooled therein to a temperature of say 120° to 150° F.

As above indicated, the normal tendency of artificially colored mineral granules to become stained or discolored upon contact with asphalt for varying periods of time is, in large measure, a function of the physical characteristics of the color film, although in part it is also a function of the physical characteristics of the base granule employed. As indicated above, the staining effect appears to result from capillary action of the granule surface which is in contact with asphalt, the extent of staining apparently being influenced by the porosity of the granule surface. While often occurring at normal atmospheric temperatures, it is accelerated at higher temperatures, such as occur frequently on roof surfaces.

At any rate, to the extent that the factors above-mentioned are responsible for the staining tendencies exhibited by granules artificially colored with color coating compositions heretofore employed, when such granules are employed as the surfacing of asphalt roofing or the like, we have found that such granules, color-coated in accordance with the invention, exhibit substantially no tendency to become stained or discolored by asphalt in which they are partially embedded, or with which they are in contact.

In respect of this staining tendency, the measure thereof may be taken by a test used fairly commonly in the asphalt roofing industry. In this test a metal panel, measuring approximately 2¾ inches by 5⅞ inches is coated with asphalt (softening point of 215° F.) to a thickness of 0.040 inch, care being taken not to overheat the asphalt. A template of the same size as the panel and formed with spaced holes of 1¾ inches diameter is placed over the asphalt coated panel. A sufficient quantity of the granules to be tested for stain resistance is placed in one of the holes in the template to cover completely the surface of the asphalt coating exposed therethrough. Likewise, a quantity of a control sample of granules of known staining properties is applied so as completely to cover the surface of asphalt coating exposed through another of the holes in the template. The template is then removed and the panel placed in an oven at 176° F., for 15 minutes. Upon the removal of the panel from the oven, the loose, unadhered granules are shaken therefrom and the remaining granules are pressed into the softened asphalt until they are well embedded therein. The panel is then replaced in the oven and held therein for 24 hours at 176° F. Upon removal therefrom, the granules under test are rated for their stain resistance by visual comparison of the sample before and after the test, and by comparison with the control sample. For the evaluation of stain resistance, according to this test, a maximum value of 10 is assigned to granules showing no trace of staining, and a minimum value of 1 is assigned to granules considered and known to be 100% stained when subjected to this test.

In term of this test, granules which have been produced by the practise of our invention exhibit a value between 8 and 9.5 on the above-mentioned scale of values. In contrast thereto, granules color coated under substantially the same operating conditions with a similar coating composition but without the inclusion of the powdered, anhydrous sodium silicate in the color coating formulation, exhibit the staining tendency to a degree indicated by a value of about 4 and frequently even lower, on the aforementioned scale.

The importance of the improvement provided by our invention in the art of artificially colored mineral granules, from the standpoint of resistance to staining of the colored granules, will accordingly be apparent to those skilled in the art. Additionally, as hereinabove stated, our invention proivdes an insolubilized film of color coating having markedly improved adhesion to the surface of the granules, showing little, if any, loss of integrity by abrasion or the like. Moreover, color coated granules of our invention have superior adhesion to the bituminous coatings used in the manufacture of asphalt roofing and the like, exhibiting substantially no tendency to become detached from the asphalt layer during manufacture, handling, storage or exposure to the weather.

Having described our invention, what we claim is:

1. The process of producing artificially colored mineral granules, which comprises applying to the surfaces of the granules a coating composition comprising pigment, a water-soluble hydrate of a silicate and powdered, anhydrous alkali metal silicate having a solubility rate of less than 20% in fifteen minutes for a 10 mesh sample, the anhydrous silicate being present in an amount of between approximately 15 and 50 percent by weight of the solids content of the water-soluble silicate, and subjecting the thus coated granules to heat treatment at temperatures within the range of approximately 400° to 1800° F., whereby to insolubilize the coating and produce a color film thereon characterized by substantial resistance to staining by bitumen or constituents thereof.

2. The process as defined in claim 1, wherein said water-soluble hydrate is an alkali metal silicate composed of approximately 2.8 to 3.7 parts $SiO_2$ to one part $Na_2O$.

3. The process as defined in claim 1, wherein said anhydrous silicate is in the form of a relatively finely divided powder.

References Cited in the file of this patent

UNITED STATES PATENTS

| 1,572,425 | Fisher | Feb. 9, 1926 |
| 1,631,628 | Fisher | June 7, 1927 |
| 2,021,716 | Douthett | Nov. 19, 1935 |

OTHER REFERENCES

P. Q. Bulletin, No. 241, 1940, pages 1, 2, 3 and 8.